United States Patent
Inagaki et al.

[11] Patent Number: 5,861,973
[45] Date of Patent: Jan. 19, 1999

[54] OPTICAL AMPLIFIER FOR COLLECTIVELY AMPLIFYING OPTICAL SIGNALS HAVING A PLURALITY OF MULTIPLEXED WAVELENGTHS

[75] Inventors: Shinya Inagaki, Kawasaki; Norifumi Shukunami, Sapporo, both of Japan

[73] Assignee: Fujitsu Limited, Kawasaki, Japan

[21] Appl. No.: 736,733

[22] Filed: Oct. 25, 1996

[30] Foreign Application Priority Data

Oct. 30, 1995 [JP] Japan ................................ 7-281182

[51] Int. Cl.⁶ .................. H01S 3/30; H01S 3/07; G02B 6/22; G02B 6/26
[52] U.S. Cl. .................. 359/341; 359/345; 385/126; 385/127
[58] Field of Search ................ 359/341, 345; 385/126, 127

[56] References Cited

U.S. PATENT DOCUMENTS

| | | | |
|---|---|---|---|
| 5,111,334 | 5/1992 | Heidemann | 359/341 |
| 5,155,621 | 10/1992 | Takeda et al. | 359/337 |
| 5,363,385 | 11/1994 | Heidemann | 359/345 |
| 5,467,218 | 11/1995 | Takeda et al. | 359/341 |
| 5,469,292 | 11/1995 | Bjarklev et al. | 359/341 |
| 5,532,870 | 7/1996 | Shigematsu et al. | 372/6 |
| 5,623,362 | 4/1997 | Mitsuda et al. | 359/345 |
| 5,668,659 | 9/1997 | Sakamoto et al. | 359/341 |

FOREIGN PATENT DOCUMENTS

| | | |
|---|---|---|
| 0 508 149 A2 | 10/1992 | European Pat. Off. |
| 0 508 880 A1 | 10/1992 | European Pat. Off. |
| 2715017 | 7/1995 | France |
| 4-10586 | 1/1992 | Japan |
| 6-69571 | 3/1994 | Japan |
| 8-95097 | 4/1996 | Japan |

OTHER PUBLICATIONS

Joseph C. Palais, "Fiber Optic Communications", Third Edition, pp. 114–117.

Search Report Issued in Counterpart British Application (Nov. 20, 1996).

Kashiwada et al, OFC '95 Opt. Fiber Comm., vol. 8, p. 438; abst. only herewith.

Primary Examiner—Nelson Moskowitz
Attorney, Agent, or Firm—Staas & Halsey

[57] ABSTRACT

Disclosed is an optical amplifier for collectively amplifying optical signals having multiplexed wavelengths. The optical amplifier enables a gain control in a range as wide as 1 dBm or larger, and employs a fiber that is doped with a rare-earth metal, such as erbium. The erbium-doped fiber in cross section is formed of a plurality of glass materials that are doped with erbium, and excitation light wavelength bands relative to the erbium-doped fiber are provided in a number equivalent to the count of the glass materials.

26 Claims, 11 Drawing Sheets

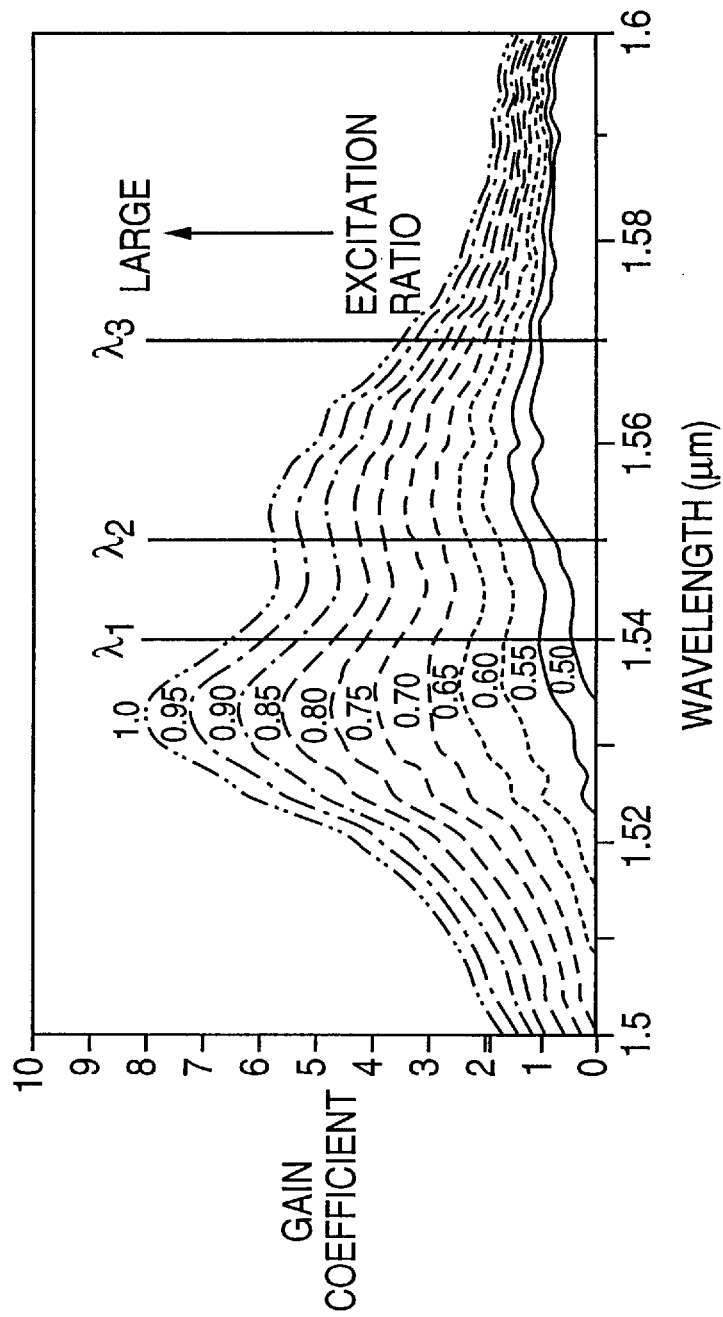

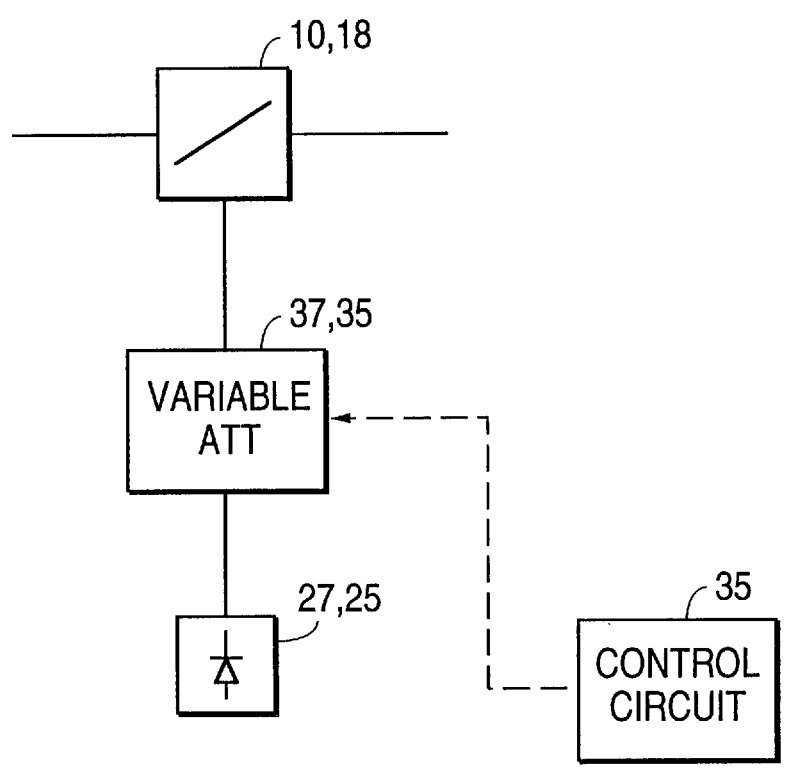

OPTICAL AMPLIFIER FOR COLLECTIVELY AMPLIFYING OPTICAL SIGNALS HAVING A PLURALITY OF MULTIPLEXED WAVELENGTHS

BACKGROUND OF THE INVENTION

1. Field of the Invention

The present invention is related to an optical amplifier employing an optical fiber that is doped with a rare-earth metal, such as erbium (Er), and in particular to an optical amplifier for collectively amplifying optical signals having a plurality of multiplexed wavelengths.

2. Related Arts

An optical amplifier that contains an optical fiber that is doped with erbium (Er) has been adopted for optical communication. Furthermore, to cope with increases in the capacities of optical communication systems, progress has been made in the development of a technique for collectively amplifying optical signals having multiple wavelengths wherein a plurality of wavelengths are multiplexed.

With the method for collectively amplifying optical signals of multi-wavelength signals, as only one optical amplifier using an erbium-doped fiber is required, there is a great economical advantage.

For such an optical amplifier for collectively amplifying optical signals of multiple wavelengths, however, a problem exists relative to the gain control for individual signal light outputs. The present inventors proposed a method for pumping two wavelengths in the 0.98 $\mu$m and 1.48 $\mu$m bands as a gain control method (e.g., "Characteristics Of EDFA For Multiple Wavelength Collective Amplification By Pumping Wavelengths In The 0.98 $\mu$m and 1.48 $\mu$m bands", "Proceedings of the 1995 IEICE General Conference (IEICE: the Institute of Electronics, Information and Communication Engineers), issued Mar. 10, 1995; corresponding U.S. patent application Ser. No. 508,471 was filed Jul. 28, 1995".

In each of the FIGS. 3A through 3C in the paper are shown a relationship between excitation light power and the gross output that the present inventors measured when two wavelengths in the 0.98 $\mu$m and 1.48 $\mu$m bands were pumped. In FIG. 1 that is an enlarged representation of the graph in FIG. 3, the horizontal axis represents a 0.98 $\mu$m pumping light power, the vertical axis represents a 1.48 $\mu$m pumping light power, and the gross output is plotted as the sum of two signal light outputs.

In FIG. 1, when it is assumed that the 0.98 $\mu$m pumping light power is 12.5 mW and the 1.48 $\mu$m pumping light power is 22.5 mW, the gross output is 11 dBm (see point P in FIG. 1). The graph in FIG. 1 was prepared by measuring and plotting such a relationship.

For the optical amplifier for collectively amplifying optical signals of multiple wavelengths, it is preferable that a gain be constant for individual wavelengths, i.e., that there be no difference in the gains for a plurality of wavelengths. In FIG. 1, $\Delta G=0$ is a characteristic line that is obtained by plotting points at which there is no gain difference between the wavelengths in the 0.98 $\mu$m and 1.48 $\mu$m bands.

It is therefore apparent from FIG. 1 that, when the 0.98 $\mu$m pumping light power is changed from 22 mW to 50 mW on the line for gain difference $\Delta G=0$, the light output can be controlled within about a 1 dBm range (A–B) of from 12.5 dBm to 13.7 dBm.

Recently, however, a demand has arisen for a system that has an enlarged gain control range, i.e., that can control the gain within a range of 6 dBm, for example.

The previously mentioned method that the present inventors proposed does not yet fully answer this demand.

SUMMARY OF THE INVENTION

It is, therefore, one object of the present invention to provide an optical amplifier, for collectively amplifying optical signals of multiple-wavelengths that enables gain control across a large range of 1 dBm or greater.

To achieve the above object, according to the present invention, an optical amplifier, which basically employs an erbium-doped fiber to collectively amplify optical signals having a plurality of wavelengths, is proposed wherein the erbium-doped fiber comprises along a cross section a plurality of glass materials with which erbium is doped, and has a plurality of pumping wavelength bands.

Or, the erbium-doped fiber has, along a cross section, a plurality of doped regions in which wavelength characteristics of absorption and emission of erbium differ, and also a plurality of pumping wavelength bands.

The present inventors realized that, in the conventional example, glass material was doped uniformly with erbium and the gain control range could not be enlarged. According to the above structure, at least two or more erbium doped glass materials are employed, or a plurality of regions having different erbium-doped concentrations are provided, and a plurality of pumping wavelength bands are employed. With this arrangement, the control range can be increased.

In other words, since a plurality of erbium-doped glass materials are employed, or a plurality of regions in which erbium-doped concentrations differ are provided, uniformity of the glass materials can be avoided, and the gain control range can be increased.

BRIEF DESCRIPTION OF THE DRAWINGS

FIG. 2 is a graph for explaining a change in dependency for a gain relative to a change in an excitation ratio;

FIG. 12 is a block diagram illustrating the processing for controlling gains between the light signals by using variable attenuators.

DETAILED DESCRIPTION OF THE PREFERRED EMBODIMENTS

Figure 1:
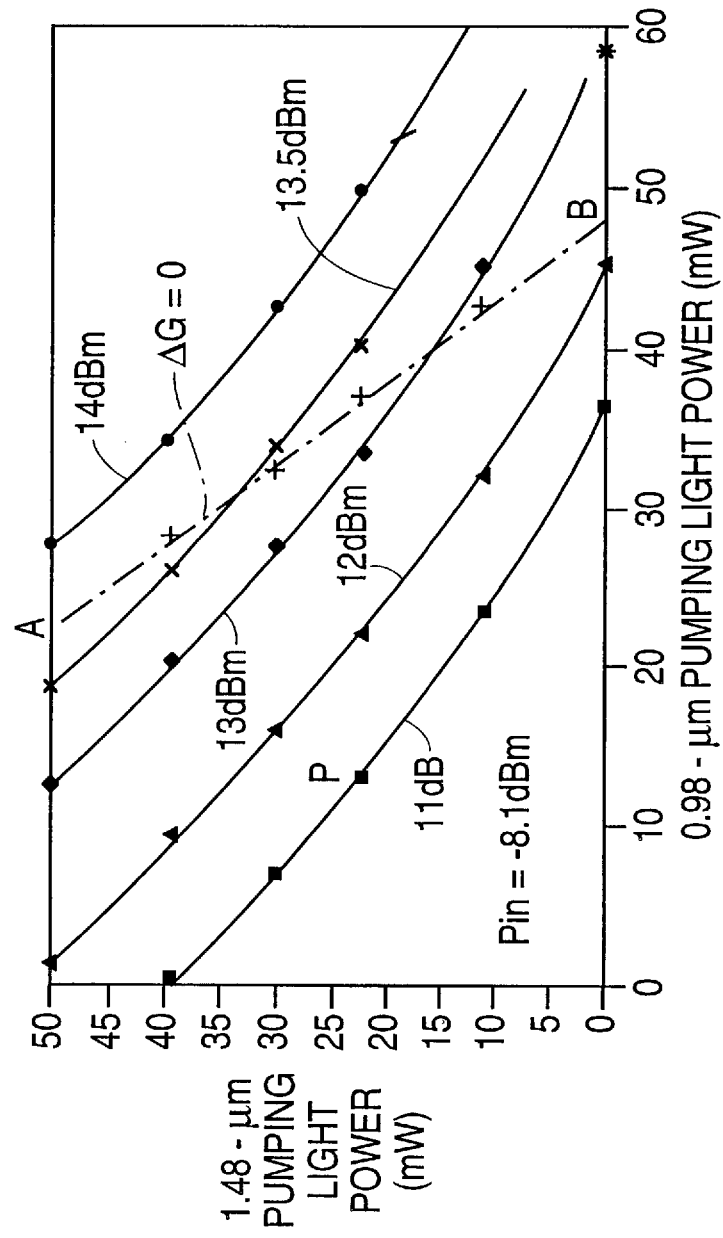
FIG. 1 is a graph showing each relationship between pumping light power and the gross output when two wavelengths bands, 0.98 $\mu$m and 1.48 $\mu$m, are pumped.

The preferred embodiments of the present invention will now be described while referring to the accompanying drawings. The same reference numerals are used to denote corresponding or identical components in the drawings. Before describing the embodiments of the present invention, the principle of the present invention will be explained, so that the present invention can be understood, while studying the characteristics of a conventional optical amplifier.

Considered in a broad perspective, the gain wavelength characteristic of an optical amplifier is determined by the excitation ratio of an erbium-doped fiber, as is shown in FIG. 2. The excitation ratio is defined as follows.

When energy level N1 of doped erbium is moved to higher energy level N2 relative to the entering of excitation light, the light is absorbed. When erbium electrons at energy level N2 are to be dropped to level N1 due to excitation light, the light is emitted. The ratio of quantity n2 at energy level N2 to a total quantity (n1+n2) at energy levels N1 and N2 is called an excitation ratio.

It is well known that when the constant excitation ratio of the erbium-doped fiber is maintained, a corresponding gain is determined, as is shown in FIG. 2.

Figure 3A:
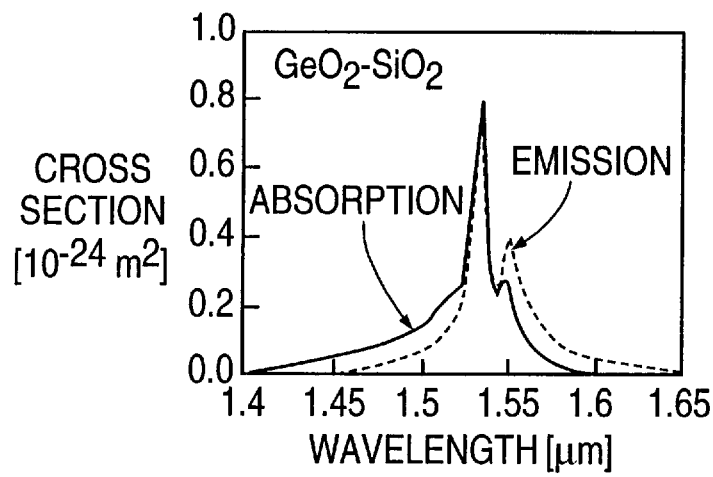
FIGS. 3A through 3C are graphs for explaining differences between glass materials for excitation light absorption and emission characteristics.
Figure 3B:
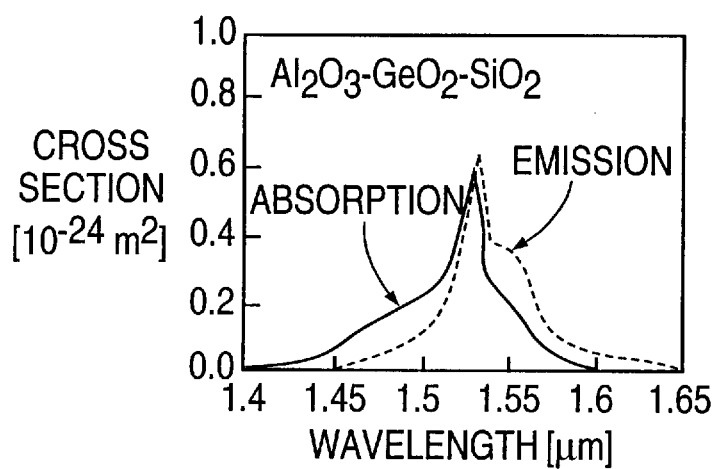
Figure 3C:
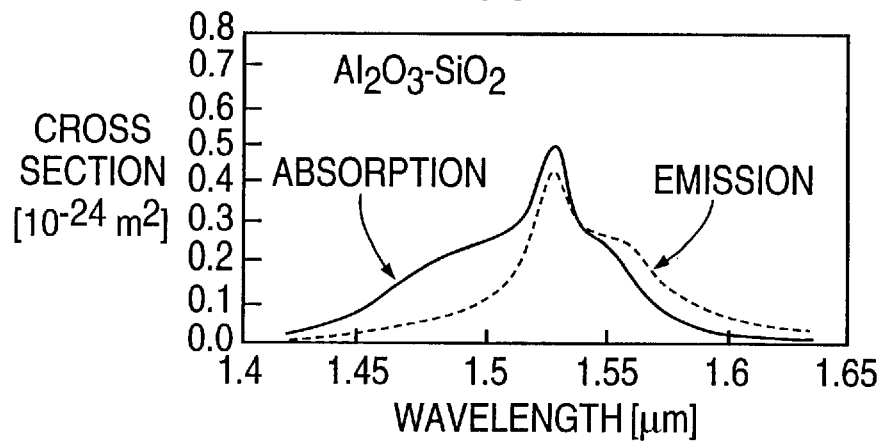

As is shown in FIGS. 3A through 3C, the present inventors focused on such matters as that the absorption and emission characteristics in cross section (excitation light absorption and emission rates correspond to cross sectional areas for light absorption and emission) differ depending on the glass material employed for the erbium-doped fiber, and that therefore, even when the excitation ratio is the same, the wavelength dependency of a gain is varied.

The graphs in FIGS. 3A through 3C represent the absorption and emission characteristics in cross section for $GeO_2$—$SiO_2$ glass, $Al_2O_3$—$GeO_2$—$SiO_2$ glass, and $Al_2O_3$—$SiO_2$ glass.

Figure 4:
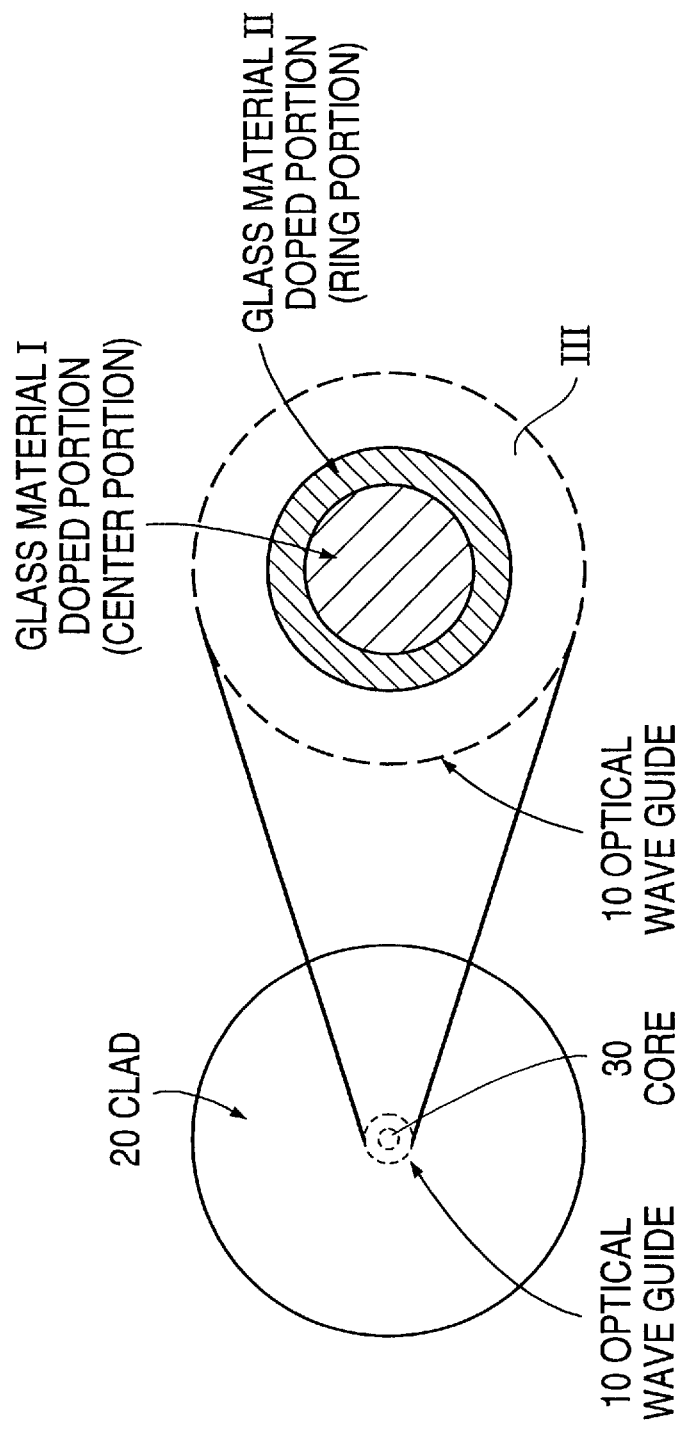
FIG. 4 is a cross sectional view of an erbium-doped fiber for explaining the principle of the present invention.

FIG. 4 is a diagram for explaining the principle of an optical amplifier according to the present invention, for collectively amplifying optical signals having a plurality of multiplexed wavelengths, that is provided based on the above described matters confirmed by the present inventors.

In FIG. 4, portion (1) is a cross section of an erbium-doped fiber 1 that has an optical waveguide 10 having a core 30, and a cladding 20 formed around it.

Portion (2) in FIG. 4 shows the enlarged optical wave guide 10, wherein a portion of erbium-doped glass material I is located at the center and a ring-shaped layer of erbium-doped glass material II is disposed around it. Further, a layer III around the glass material layer II is formed of a material that is not doped with erbium, such as a silica glass.

The glass materials I and II have different components. In other words, glass materials are selected for which the excitation light absorption/emission characteristics differ, as is described while referring to FIGS. 3A through 3C.

Figure 5:
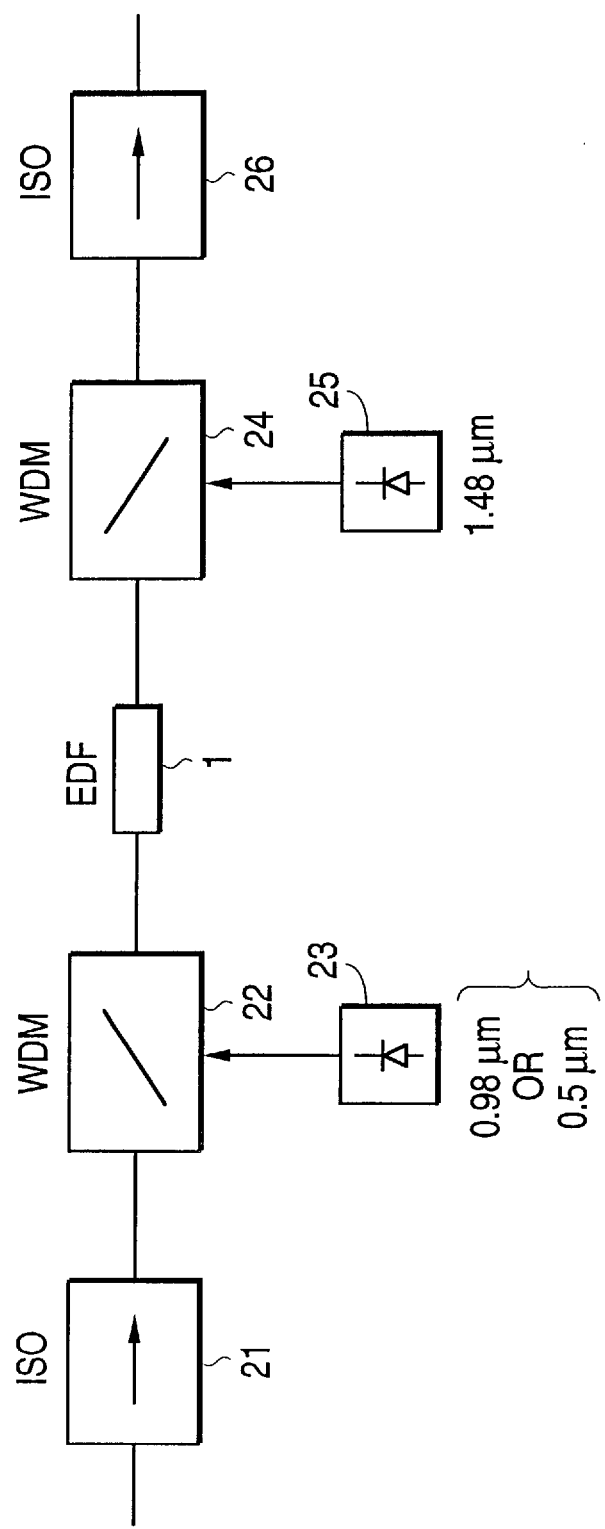
FIG. 5 is a diagram illustrating the arrangement of an optical amplifier that employs the erbium-doped fiber and is used for explaining the principle of the present invention.

The optical amplifier of the present invention that collectively amplifies optical signals of multiplexed wavelengths employs the erbium-doped fiber shown in FIG. 4, so that, as is shown in FIG. 5, it can independently control excitation light power in a plurality of wavelengths (two in FIG. 5), which are supplied to the erbium-doped fiber.

More specifically, in FIG. 5, reference numeral 1 denotes an erbium-doped fiber shown in FIG. 4; 21 and 26, isolators; 22 and 24, first and second wavelength multiplexers; 23, a 0.98 $\mu$m light, or 0.5 $\mu$m light generator; and 25, a 1.48 $\mu$m light generator.

The first wavelength multiplexer 22 transmits excitation light in the 0.98 $\mu$m band or the 0.5 $\mu$m band to the erbium-doped fiber 1, and the second wavelength multiplexer 24 transmits excitation light in the 1.48 $\mu$m band to the erbium-doped fiber 1 to excite the erbium with which the fibers are doped.

As will be described later in the embodiments, mode field diameters of the erbium-doped fiber 1 differ depending on wavelength bands. Since, for example, a wavelength in a 0.98 $\mu$m or 0.5 $\mu$m band is shorter than that in a 1.48 $\mu$m band, the light in the 0.98 $\mu$m or 0.5 $\mu$m band can selectively excite the centrally located erbium-doped portion (the glass material layer I). Light in the 1.48 $\mu$m wavelength band can selectively excite the external ring-shaped erbium-doped layer (the glass material II).

As a result, the excitation ratios can be independently controlled at the center portion and at the ring portion, and gain control across a wide range is possible.

First Embodiment

Figure 6:
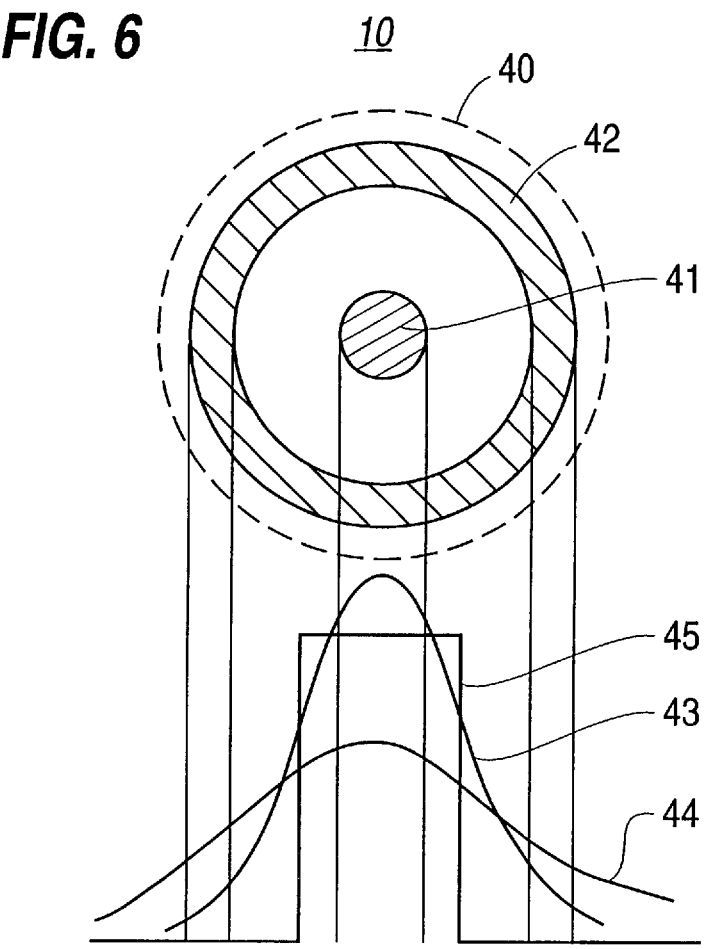
FIG. 6 is a cross sectional view of the structure of an optical waveguide in a first embodiment of the present invention.

FIG. 6 is a cross sectional view of an optical waveguide of an erbium-doped fiber 1 according to a first embodiment of the present invention. In FIG. 6, a portion 40 enclosed by a circular broken line corresponds to the optical waveguide 10 in FIG. 2. In this embodiment, a glass portion 41 of $GeO_2$—$SiO_2$ is located at the center, and a ring-shaped glass layer 42 of $Al_2O_3$—$SiO_2$ is disposed around it.

The glass layers 41 and 42 are doped with erbium. The other portions of the optical waveguide 10 are formed of silica glass, and as an impurity, Ge is doped to the area that serves as a core.

$GeO_2$—$SiO_2$ is employed for the center glass portion 41, and $Al_2O_3$—$SiO_2$ is employed for the glass ring layer 42 for the following reasons.

As is shown in FIG. 6, a mode field 43 for 0.98 $\mu$m excitation light, in a distribution for a refractive index, is narrower than a mode field 44 of 1.48 $\mu$m excitation light. Therefore, the 0.98 $\mu$m excitation light can selectively excite the erbium-doped glass portion 41 at the center, while the 1.48 $\mu$m excitation light can selectively excite the ring-shaped erbium-doped glass layer 42.

In the optical amplifier in FIG. 6, since the erbium-doped fiber 1 in FIG. 5 is arranged as is shown in FIG. 6, and with this arrangement the excitation light generator 23 supplies 0.98 $\mu$m band light forward while the excitation light generator 25 supplies 1.48 $\mu$m band light backward, excitation light power can be controlled independently for the glass portion 41 and the glass layer 42.

Figure 7:
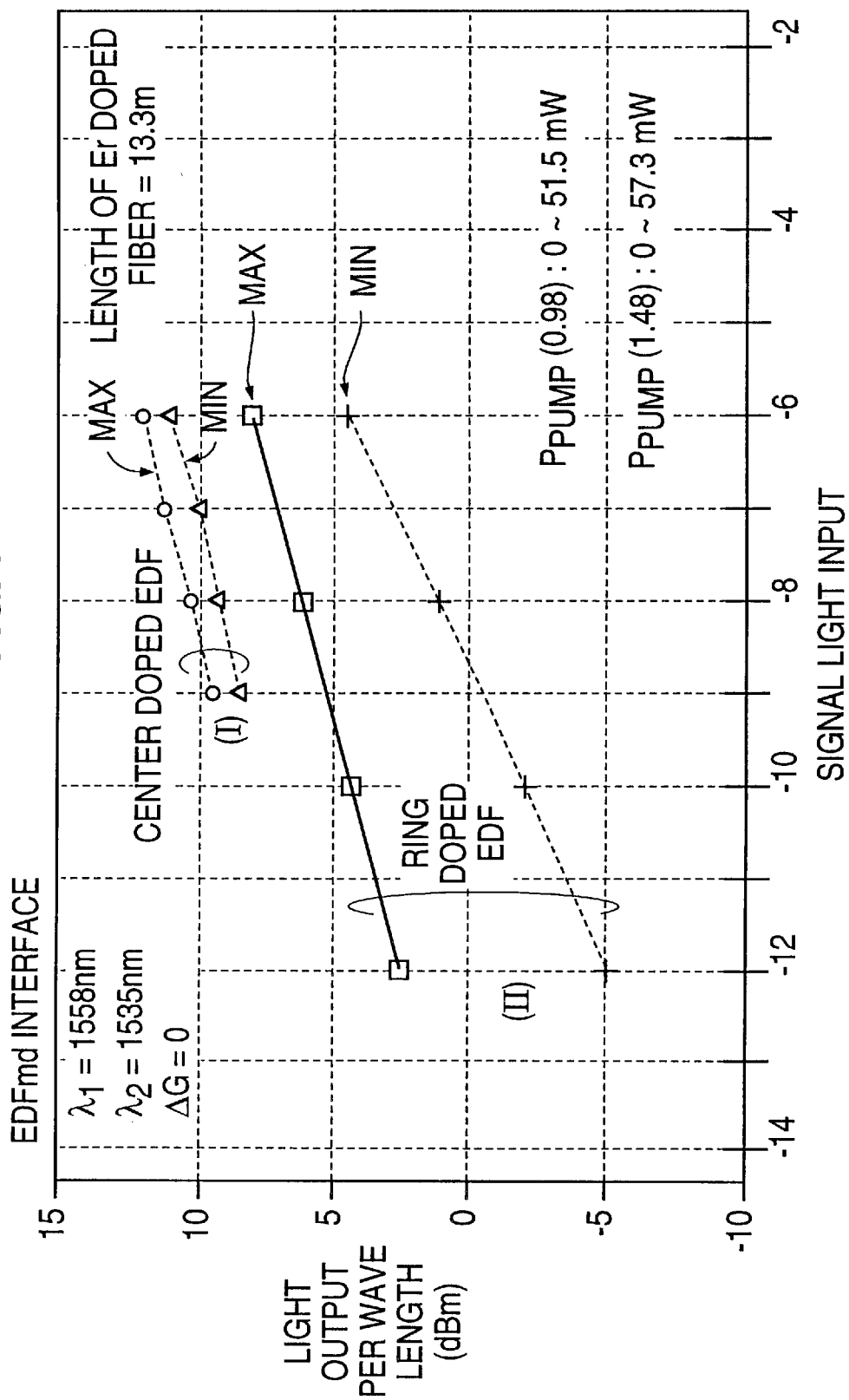
FIG. 7 is a graph for explaining the effects of the present invention.

FIG. 7 is a graph for explaining the effects obtained in the first embodiment in FIG. 6. In FIG. 7, the horizontal axis represents optical signal input, while the vertical axis represents optical signal output, and a relationship between a minimum gain and a maximum gain when there is no gain difference between two excitation wavelength lights ($\Delta G=0$) is shown.

In FIG. 7, (I) represents the characteristic of an optical amplifier using a conventional erbium-doped fiber of one type of glass material that forms a layer, and for which only the center of a waveguide is doped with erbium. As is explained while referring to FIG. 1, the gain control width of the characteristic (I) is about 1 dBm relative to a signal light input of −9 to −6 dBm.

The optical amplifier of the present invention, which is designed as is shown in FIG. 5 by using the erbium-doped fiber 1 shown in FIG. 6, can provide a gain control width of 4 to 7.5 dBm (about 5.8 dBm on the average) relative to a signal light input of −12 to −6 dBm.

Second Embodiment

In this embodiment, the erbium-doped glass portion 41 in the center in FIG. 6 is formed of $Al_2O_2$—$GeO_2$—$SiO_2$, instead of $GeO_2$—$SiO_2$, in order to expand the band for a gain near 1.55 $\mu$m. The general structure of an optical amplifier in this embodiment is the same as that in the first embodiment. The band is extended because the absorption/emission cross sectional band of $Al_2O_3$—$GeO_2SiO_2$ in FIG. 3B is wider than that of $GeO_2$—$SiO_2$ in FIG. 3A.

Third Embodiment

Figure 8:
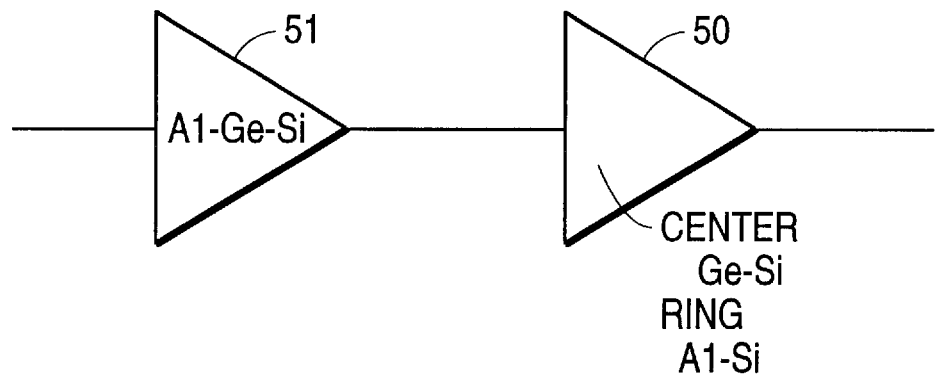
FIG. 8 is a diagram illustrating the arrangement of a third embodiment of the present invention.

FIG. 8 is a diagram illustrating a third embodiment of the present invention, where an optical amplifier that employs the erbium-doped fiber in the first embodiment of the present invention is connected in tandem to a conventional optical amplifier 51 that employs an erbium-doped fiber, and where erbium is used to dope $Al_2O_3$—$GeO_2$—$SiO_2$ glass.

In this embodiment, the absorption/emission cross sectional areas of three erbium-doped layers formed of $GeO_2$—$SiO_2$ glass, of $GeO_2$—$Al_2O_3$—$SiO_2$ glass, and of Al—Si glass can be employed for gain control.

Fourth Embodiment

Although not shown, in the same manner as in FIG. 8, an optical amplifier employed in the second embodiment can be connected in tandem to an optical amplifier that employs an erbium-doped fiber, where erbium is used to dope Ge—Si glass. In this case, the absorption/emission cross sectional areas of erbium-doped Ge—Si glass, erbium-doped $GeO_2$—$SiO_2$ glass, and erbium-doped $Al_2O_2$—$GeO_2$—$SiO_2$ can be employed for gain control.

Fifth Embodiment

Figure 9:
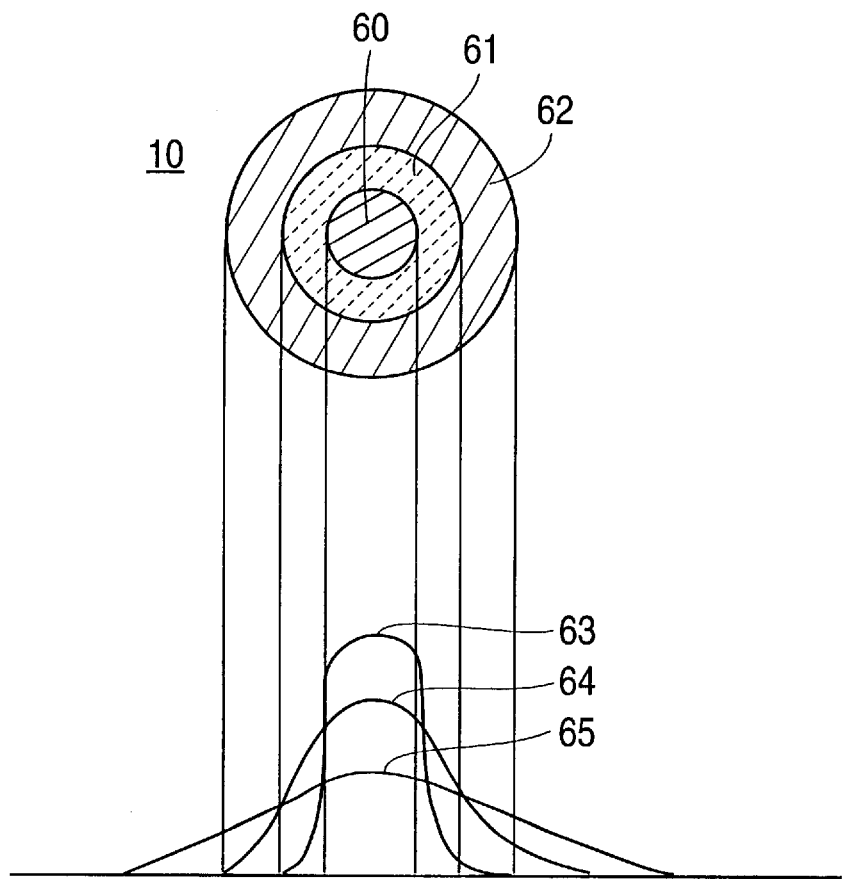
FIG. 9 is a cross sectional view of an optical waveguide, for an erbium-doped fiber, in a fifth embodiment of the present invention.
Figure 10:
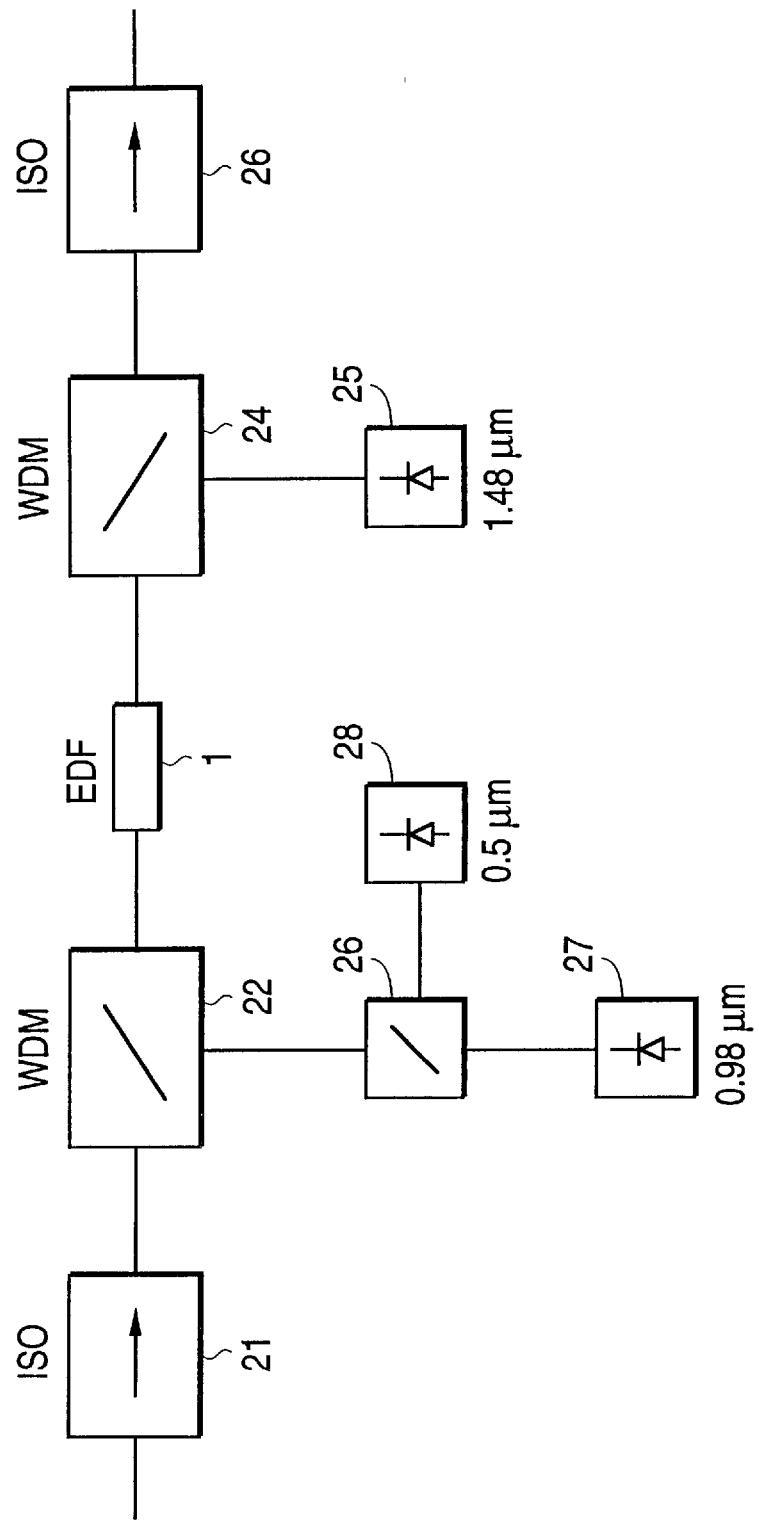
FIG. 10 is a diagram illustrating the arrangement of an optical amplifier that employs the erbium-doped fiber in FIG. 9.

FIGS. 9 and 10 are diagrams illustrating an optical amplifier that utilizes differences between three mode fields for excitation light in the 0.5 $\mu$m, 0.98 $\mu$m and 1.48 $\mu$m bands, and that applies a fiber where different glass materials are doped with erbium at points where the differences between the mode fields are great.

More specifically, in FIG. 9, regions 60 to 62 in the cross section of an optical waveguide 10 are different erbium-doped glass materials. Mode fields 63 through 65 are those in the 0.5 $\mu$m, 0.98 $\mu$m and 1.48 $\mu$m band refractive index distributions.

FIG. 10 is a diagram illustrating an optical amplifier that uses the erbium-doped fiber shown in FIG. 9. The difference from the other embodiments is that a coupler 26 and excitation light generators 27 and 28 are provided, so that light in the 0.5 $\mu$m band and light in the 0.98 $\mu$m band, output by the generators 27 and 28, are mixed together, and the resultant light is supplied via a wavelength division modulator 22 to the erbium-doped fiber 1.

The excitation light generator 28 that generates light in the 0.5 $\mu$m band can not only be a single laser diode, but can also be constituted by a multiple wave resonance laser SHG (a device for multiplying the wavelength of a YAG layer output of 1.064 $\mu$m).

Although not shown, the second through the fifth embodiments can provide the same effects as that of the first embodiment in FIG. 7, wherein the gain control width is larger than that of a conventional device.

For the optical amplifier that includes an optical fiber, which is doped with a rare-earth such as erbium, to optically amplify a wavelength-multiplexed signal the present inventors proposed a method for controlling the gain difference between light signals in a previously submitted Japanese Patent Application (Japanese Patent Application No. Hei 7-214602; and corresponding U.S. Patent Application and European Patent Treaty Application designating GB, DE and FR).

Therefore, the optical amplifier that includes the optical fiber of the present invention can be applied to the method of the preciously submitted application for controlling a difference in the gain between optical signals. One embodiment is shown in FIG. 11.

Figure 11:
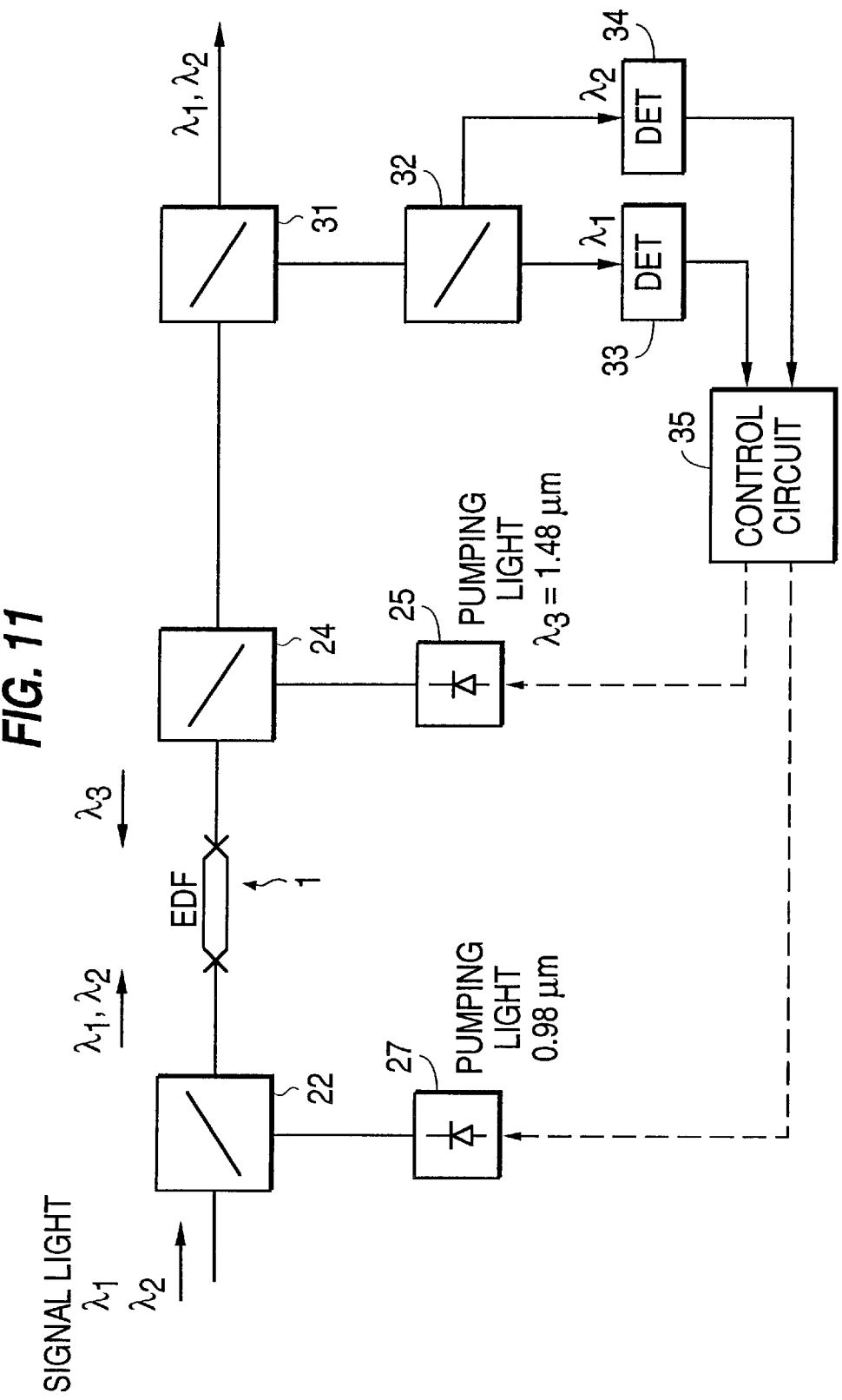
FIG. 11 is a block diagram illustrating the processing for controlling gains between light signals emitted by the optical amplifier that employs the erbium-doped fiber of the present invention.

FIG. 11 is a block diagram of the processing, for the optical amplifier that includes the optical fiber of the present invention, for controlling a difference in gain between light signals by using the method that is proposed in the previously mentioned Japanese Patent Application (Japanese Patent Application No. Hei-214602; and corresponding U.S. Patent Application and European Patent Treaty Application designating GB, DE and FR).

In FIG. 11, signal light consisting of two different wavelengths, $\lambda_1$ and $\lambda_2$ ($\lambda_1 < \lambda_2$), is combined in a beam combiner 22 with pumping light (at, for example, a wavelength of 0.98 $\mu$m) from a light source 27, and enters an erbium-doped fiber 1, which is configured as is explained in FIG. 6. Pumping light from a light source 25 emitted at wavelength $\lambda_3$ (for example, $\lambda_3$=1.48 $\mu$m) is introduced by a beam combiner 24 into the erbium-doped fiber 1 in the direction opposite to the direction of the signal light. Some of the signal light amplified by the erbium-doped fiber 1 is branched off by an optical coupler 31, and enters a beam splitter 32 wherein the light is split into wavelengths $\lambda_1$ and $\lambda_2$, whose optical powers are respectively detected by photodetectors 33 and 34. Based on the detection outputs of the photodetectors 33 and 34, a control circuit 35 controls drive currents to the light sources 27 and 25, and thus controls the optical power.

It will be understood that the injection direction for each pumping light is not limited to that shown in the illustrated example. Further, instead of controlling the drive currents to the light sources 27 and 25 so as to control the injection powers of the respective pumping lights, variable attenuators 37 and 35 may be provided between the light sources 27 and 25 and the beam combiners 22 and 24, as is shown in FIG. 12, and the degree of attenuation provided by the variable attenuators 37 and 35 may be controlled so as to control the injection powers of the pumping lights.

As is shown in FIG. 15, for Japanese Patent Application No. Hei 6-229164, with the pumping light in the 0.98 $\mu$m band the gain is greater at the shorter wavelength than at the longer wavelength, whereas with the pumping light in the 1.48 $\mu$m band the gain is higher at the longer wavelength than at the shorter wavelength. The control circuit 28 calculates optical wavelength outputs $\lambda_1$ and $\lambda_2$ from the outputs of the photodetectors 33 and 34, and if the optical output power $P_1$, at the shorter wavelength $\lambda_1$, is greater than the optical output power $P_2$, at the longer wavelength $\lambda_2$, it reduces the power of the 0.98 $\mu$m pumping light that contributes to a higher gain at the shorter wavelength, and increases the power of the 1.48 $\mu$m pumping light that increases the gain at the shorter wavelength. Conversely, if $P_2$ is larger than $P_1$, the power of the 1.48 $\mu$m pumping light is reduced, while the power of the 0.98 $\mu$m pumping light is increased. Furthermore, if the combined optical output power of the two optical signals is smaller than a desired output power, the pumping light powers for both the 0.98 $\mu$m and 1.48 $\mu$m bands are raised; and if the combined optical output power is larger than the predetermined output power, both pumping light powers are reduced, so that the desired optical output can be obtained.

As has been described above, according to the embodiment shown in FIG. 11, the pumping light powers in the 0.98 $\mu$m and 1.48 $\mu$m bands are adjusted while the output of each optical signal is monitored, so that the desired output can be obtained for each optical signal.

As is described above, although the gain control range of the conventional method is only 1 dBm, according to the embodiments of the present invention, the gain can be so controlled that it covers a larger range.

In addition, in the above embodiments, two or more different glass materials that are doped with erbium are employed to maintain a constant gain. The present invention is not limited to this method. More specifically, the present inventors confirmed through experiments that the excitation light absorption/emission cross sectional area was varied in proportion to the concentration of doped erbium. Therefore, the gain control range can be increased by changing the erbium doping quantity instead of changing the glass material.

What is claimed is:

1. An optical amplifier comprising:
   an erbium doped fiber including a first cross section layer of glass material doped with erbium and germanium, and a second cross section layer doped with erbium and aluminum surrounding the first cross section layer, said first and second cross section layers having different emission cross section characteristics from each other, for collectively amplifying optical signals of a plurality of wavelengths; and
   first and second light sources for generating excitation lights in first and second wavelength bands, respectively, and for emitting the excitation lights to the erbium doped fiber.

2. The optical amplifier according to claim 1, further comprising a circuit for controlling powers of said excitation lights in said first and second wavelength bands that are emitted by said first and second light sources.

3. The optical amplifier according to claim 2, wherein said wavelength bands of said excitation lights are a 1.48 $\mu$m band and a 0.98 $\mu$m band, respectively, and a cutoff wavelength of said erbium doped fiber is 0.98 $\mu$m or shorter.

4. The optical amplifier according to claim 3, wherein an internal diameter of said second cross section layer is set outside a 0.98 $\mu$m light mode field diameter, and an outer diameter of said second cross section layer is set inside a 1.48 $\mu$m light mode field diameter.

5. The optical amplifier according to claim 1, wherein said first cross section layer is formed of $GeO_2$—$SiO_2$ glass, and said second cross section layer is formed of $Al_2O_3$—$SiO_2$ glass.

6. The optical amplifier according to claim 1, wherein said first cross section layer is formed of $GeO_2$—$Al_2O_3$—$Si$ glass, and said second cross section layer is formed of $Al_2O_3$—$SiO_2$ glass.

7. The optical amplifier according to claim 6, having an additional optical amplifier that employs an erbium-doped fiber of $Al_2O_3$—$GeO_2$—$SiO_2$ glass connected in tandem.

8. The optical amplifier according to claim 6, having an additional optical amplifier that employs an erbium-doped fiber of $GeO_2$—$SiO_2$ glass connected in tandem.

9. An optical amplifier comprising:
   an erbium doped fiber having three cross section layers of glass materials which are doped with erbium; and
   three light sources for generating excitation lights in a 1.48 $\mu$m band, a 0.5 $\mu$m band and a 0.98 $\mu$m band, respectively, and for emitting the excitation lights to the erbium doped fiber,
   wherein an innermost layer of said three cross section layers is located at a center of the erbium doped fiber, a second layer is located near a middle of mode field diameters for said 0.5 $\mu$m and 0.98 $\mu$m bands, and a third layer is located near a middle of mode field diameters for said 0.98 $\mu$m band and said 1.48 $\mu$m band.

10. An optical amplifier comprising:
    an optical fiber including first and second cross section layers with the second cross section layer surrounding the first cross section layer, the first and second cross section layers both being made of glass doped with a rare earth element and having different emission cross section characteristics; and
    first and second light sources providing excitation lights in first and second wavelength bands, respectively, to the optical fiber, so that a plurality of different wavelengths included in a wavelength division multiplexed (WDM) signal travelling through the optical fiber are collectively amplified,
    wherein the first cross section layer is doped with erbium and germanium, and the second cross section layer is doped with erbium and aluminum.

11. An optical amplifier comprising:
    an optical fiber including first and second cross section layers with the second cross section layer surrounding the first cross section layer, the first and second cross section layers both being made of glass doped with a rare earth element and having different emission cross section characteristics;
    first and second light sources providing excitation lights in first and second wavelength bands, respectively, to the optical fiber, so that a plurality of different wavelengths included in a wavelength division multiplexed (WDM) signal travelling through the optical fiber are collectively amplified; and
    a circuit controlling powers of the excitation lights in the first and second wavelength bands.

12. An optical amplifier comprising:
    an optical fiber including first and second cross section layers with the second cross section layer surrounding the first cross section layer, the first and second cross section layers both being made of glass doped with a rare earth element and having different emission cross section characteristics; and
    first and second light sources providing excitation lights in first and second wavelength bands, respectively, to the optical fiber, so that a plurality of different wavelengths included in a wavelength division multiplexed (WDM) signal travelling through the optical fiber are collectively amplified,
    wherein the wavelength bands of the excitation lights are a 1.48 $\mu$m band and a 0.98 $\mu$m band, respectively, and a cutoff wavelength of the optical fiber is 0.98 $\mu$m or shorter.

13. The optical amplifier according to claim 11, wherein the wavelength bands of the excitation lights are a 1.48 $\mu$m band and a 0.98 $\mu$m band, respectively, and a cutoff wavelength of the optical fiber is 0.98 $\mu$m or shorter.

14. The optical amplifier according to claim 12, wherein an internal diameter of the second cross section layer is set outside a 0.98 $\mu$m light mode field diameter, and an outer diameter of the second cross section layer is set inside a 1.48 $\mu$m light mode field diameter.

15. An optical amplifier comprising:
    an optical fiber including first and second cross section layers with the second cross section layer surrounding the first cross section layer, the first and second cross section layers both being made of glass doped with a rare earth element and having different emission cross section characteristics; and first and second light sources providing excitation lights in first and second wavelength bands, respectively, to the optical fiber, so that a plurality of different wavelengths included in a wavelength division multiplexed (WDM) signal travelling through the optical fiber are collectively amplified, wherein the first cross section layer is formed of $GeO_2$—$SiO_2$ glass, and the second cross section layer is formed of $Al_2O_3$—$SiO_2$ glass.

16. An optical amplifier comprising:

an optical fiber including first and second cross section layers with the second cross section layer surrounding the first cross section layer, the first and second cross section layers both being made of class doped with a rare earth element and having different emission cross section characteristics; and first and second light sources providing excitation lights in first and second wavelength bands, respectively, to the optical fiber, so that a plurality of different wavelengths included in a wavelength division multiplexed (WDM) signal travelling through the optical fiber are collectively amplified, wherein the first cross section layer is formed of $GeO_2$—$Al_2O_3$—Si glass, and the second cross section layer is formed of $Al_2O_3$—$SiO_2$ glass.

17. The optical amplifier according to claim 15, having an additional optical amplifier that employs an erbium-doped fiber of $Al_2O_3$—$GeO_2$—$SiO_2$ glass connected in tandem.

18. The optical amplifier according to claim 16, having an additional optical amplifier that employs an erbium-doped fiber of $GeO_2$—$SiO_2$ glass connected in tandem.

19. An optical amplifier comprising:

an optical fiber having first, second and third concentrically arranged cross section layers of glass materials which are each doped with a rare earth element, the second layer concentrically arranged around the first layer, and the third layer concentrically arranged around the second layer; and first, second and third light sources providing excitation lights in first, second and third bands, respectively, to the optical fiber so that a plurality of different wavelengths included in a wavelength division multiplexed (WDM) signal travelling through the optical fiber are collectively amplified, wherein the first layer is at a position corresponding to a mode field diameter of the first band so that the first layer is excited by excitation light in the first band to a higher degree than by excitation lights in the second and third bands, the second layer is at a position corresponding to a mode field diameter of the second band so that the second layer is excited by excitation light in the second band to a higher degree than by excitation lights in the first and third bands, and the third layer is at a position corresponding to a mode field diameter of the third band so that the third layer is excited by excitation light in the third band to a higher degree than by excitation lights in the first and second bands.

20. The optical amplifier according to claim 19, wherein the first, second and third bands are a 0.5 $\mu$m band, a 0.98 $\mu$m band and a 1.48 $\mu$m band, respectively.

21. The optical amplifier according to claim 19, wherein the rare earth element is erbium.

22. The optical amplifier according to claim 19, wherein the first, second and third layers have different emission cross section characteristics.

23. An optical amplifier comprising:

an optical fiber having first and second concentrically arranged cross section layers of glass materials which are each doped with a rare earth element, the second layer concentrically arranged around the first layer; and first and second light sources providing excitation lights in first and second bands, respectively, to the optical fiber so that a plurality of different wavelengths included in a wavelength division multiplexed (WDM) signal travelling through the optical fiber are collectively amplified, wherein the first layer is at a position corresponding to a mode field diameter of the first band so that the first layer is excited by excitation light in the first band to a higher degree than by excitation light in the second band, and the second layer is at a position corresponding to a mode field diameter of the second band so that the second layer is excited by excitation light in the second band to a higher degree than by excitation light in the first band.

24. The optical amplifier according to claim 23, wherein the first and second bands are a 0.98 $\mu$m band and a 1.48 $\mu$m band, respectively.

25. The optical amplifier according to claim 23, wherein the rare earth element is erbium.

26. The optical amplifier according to claim 23, wherein the first and second layers have different emission cross section characteristics.

* * * * *